United States Patent
Silverman

(10) Patent No.: US 6,612,423 B1
(45) Date of Patent: Sep. 2, 2003

(54) CO-EXTRUDED DRIVER PAD WITH WEAR INDICATOR

(75) Inventor: David Silverman, St. Louis County, MO (US)

(73) Assignee: Alvey Systems, Inc., St. Louis, MO (US)

( * ) Notice: Subject to any disclaimer, the term of this patent is extended or adjusted under 35 U.S.C. 154(b) by 0 days.

(21) Appl. No.: 10/189,135

(22) Filed: Jul. 2, 2002

(51) Int. Cl.⁷ .............................................. B65G 13/07
(52) U.S. Cl. .................................. 198/790; 198/781.03
(58) Field of Search .......................... 198/781.03, 790, 198/781.1, 835

(56) References Cited

U.S. PATENT DOCUMENTS

| | | | | |
|---|---|---|---|---|
| 3,323,636 A | * | 6/1967 | Gotram ...................... | 198/790 |
| 4,458,809 A | * | 7/1984 | White et al. ................. | 198/790 |
| 4,588,073 A | | 5/1986 | Abell ....................... | 198/790 X |
| 4,753,339 A | * | 6/1988 | Vogt et al. ............... | 198/790 X |
| 5,176,246 A | | 1/1993 | Wiggers et al. ............. | 198/790 |
| 5,209,342 A | * | 5/1993 | vom Stein .................. | 198/790 |
| 5,984,082 A | | 11/1999 | Geib ........................... | 198/790 |

* cited by examiner

Primary Examiner—James R. Bidwell
(74) Attorney, Agent, or Firm—Polster, Lieder, Woodruff & Lucchesi, L.C.

(57) ABSTRACT

An article conveyor having live rollers driven by a polymeric driven pad which has a wear indicator element co-extruded with the driven pad. The element is visually distinct from the pad and has converging sides in the driven pad so that wear on the pad is indicated by the amount of the wear element visible to an observer.

9 Claims, 2 Drawing Sheets

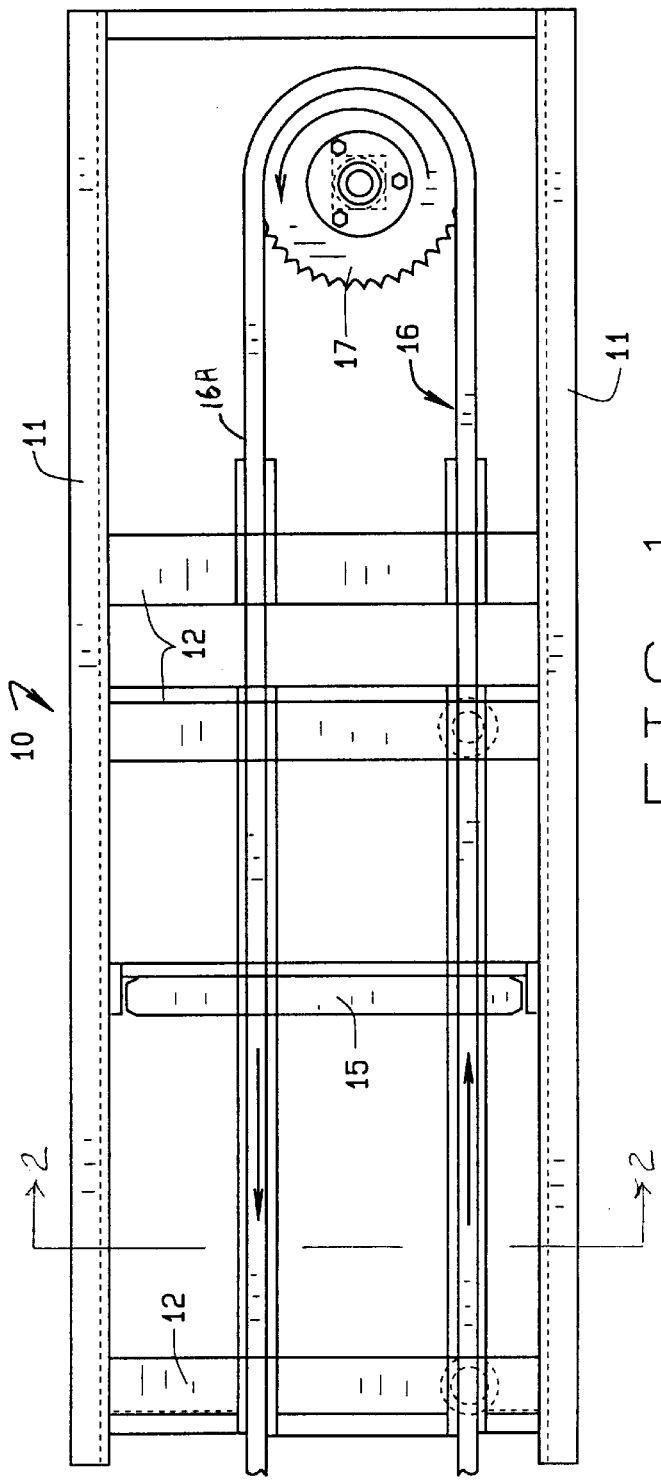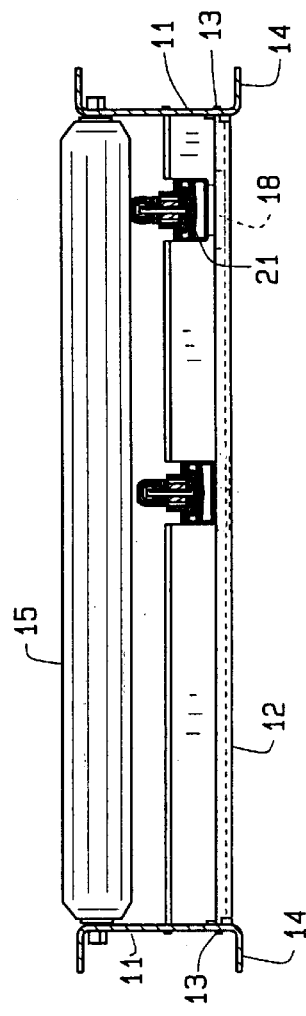

CO-EXTRUDED DRIVER PAD WITH WEAR INDICATOR

CROSS REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to improvements in article conveyance systems having roller bed assemblies frictionally powered by plastic driver pads carried on a chain drive mechanism.

2. Description of the Prior Art

Abell U.S. Pat. No. 4,588,073, and Wiggers & Alderink U.S. Pat. No. 5,176,246 (both owned by the assignee of this invention) disclose padded chain drives for roller conveyors. In these conveyors, the pads are moved into engagement with the rollers to drive the rollers and advance articles on the conveyor and are disengaged from the rollers when the conveyor is not moving articles. The pads are positioned on the chain link drive and advance with the drive chain. Geib U.S. Pat. No. 5,984,082 also is directed to a padded chain drive for a roller conveyor.

The pads conventionally are resilient, thermoplastic polyurethane elastomers. As such, they are subject to wear from frictionally engaging the rollers. Thus the pads require periodic maintenance and replacement. However, it has always been difficult to determine when the driver pad has worn enough to require replacement. The common practice is to use calipers or height gauges to measure the driver pad height and thus determine when the minimum height is reached when replacement is required. Both of these processes are difficult to use, particularly the calipers, and both measure only in one place and not over the entire length of pad. Since the chains and pads extend for hundreds of feet in some conveyors, it is apparent that it is difficult, if not virtually impossible to be sure the measurement has been made at the thinnest place, i.e., the place where the pad is most likely to fail.

BRIEF SUMMARY OF THE INVENTION

Accordingly it is a principal object of this invention to provide a driver pad which has a built-in system for determining wear on the pad. This is achieved in the present invention by co-extruding the driver pad with a visually distinct wear element embedded in, the same composition as, and integral with the remainder of the polymer pad, but preferably of a different color.

The majority of the pad is of one color and the visually distinct wear element part of the pad is of a distinctly different color. The colored portion. preferably is substantially triangular in shape with the base of the triangle oriented toward the conveyor rollers. The sides of the wear element converge toward each other in the pad when viewed in cross-section. Thus, the width of the colored surface indicates the relative wear on the driver pad and if there is no color present, the pad needs replacement.

Since the colored segment extends the entire length of the pad and chain, one can observe the entire pad from a single viewing point while the chain is moving. Alternatively, once can walk the length of the pad and observe its total condition by visual observation.

These and other objects, benefits and advantages of the present invention will become apparent to those skilled in the art upon a reading and understanding of the following detailed specification and drawings.

BRIEF DESCRIPTION OF THE SEVERAL VIEWS OF THE DRAWINGS

In the drawings, where like numbers and letters refer to like parts wherever they occur:

FIG. 1 is a fragmentary plan view of the conveyor showing the drive chain drive sprocket and the drive of the rollers in the area of the sprocket;

FIG. 2 is an enlarged transverse sectional view taken along line 2—2 of FIG. 1;

DETAILED DESCRIPTION OF INVENTION

Figure 3:
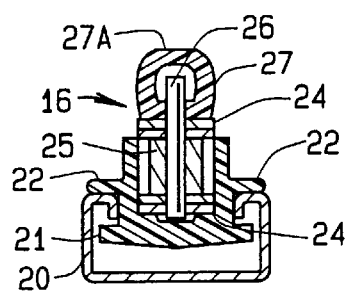
FIG. 3 is an enlarged sectional detail of the mounting of the pad on the roller chain.

The present invention is specifically designed for application to the conveyor assemblies shown in Patent Nos. 4,588,073 and 5,176,246, both of which are incorporated herein by reference. FIGS. 1, 2 and 3 are exemplary of the conveyor mechanisms to which the present invention is applicable. This invention also is applicable to the conveyor pad and drive assembly shown in Pat. No. 5,984,082, which also is incorporated herein by reference.

Referring now to FIG. 1, the general construction of a load transportation conveyor has been illustrated at the end portion where the drive mechanism for the load bearing rollers is shown. The conveyor includes special channel-shaped side rails 11 held in spaced parallel positions by spaced cross channels 12 which are secured (see FIG. 2) to the vertical webs of the side rails 11 by tabs 13 that engage in the webs just above the bottom out-turned flange 14 of the side rails 11. While FIG. 1 does not show a full complement of load supporting rollers 15, it is intended to show in a schematic way the drive for the rollers 15 which includes an approaching length of a drive assembly 16 and a return length 16A of that same drive assembly after these lengths have passed around a driven sprocket 17.

The view of FIG. 2 shows a transverse sectional elevation of the construction of FIG. 1. In this view the side rails 11 support the load carrying rollers which are mounted with the projecting axles resting in slots on the side rails 11. The spacer channels 12 are seen to support lifting means 18 of a well known character with which the drive assembly 16 is associated for the purpose of lifting or lowering the drive assembly 16. The system normally is operated so that the lifts 18 are actuated to raise the roller drive assembly 16 into contact with the under side of the load supporting rollers 15. The return length 16A is known as a "return track" and is always out of contact with the rollers 15.

In the conveyor the drive assembly 16 is shown in FIG. 3 and embodies a guide track which extends continuously along the conveyor length. The guide track carries an equally elongated low friction track 21 which is formed with flanges 22 which project laterally to embrace the side walls of the guide track 20. The roller chain drive assembly 16 embodies a system of side links 24 which are oriented in horizontal planes with roller elements 25 captured between the links by vertically directed axles 26, thereby allowing the chain assembly to follow a path which traverses the driver sprocket 17. In this arrangement, each axle 26 for the roller elements 25 is elongated so its upper end is exposed to a suitable extent to be inserted into apertures in the bottom of an elongated high friction drive pad 27. The pad is hollow so that the upper surface 27A is able to flex when it is lifted by the lifts 18 to engage the under side of the load supporting rollers 15. The pad 27 is provided with apertures for the axles 26 of each chain roller to thereby maintain a better contact over the pad flexture as it transverses the driver sprocket 17.

It has been found that the top surface 27A of the drive pad 27 wears during operation of the conveyor 10. This is caused by the frictional wear from engaging and driving the rollers 15. Over time, the hollow pad 27 will become thinner and the wear will lessen the friction drive to the rollers enough to stall the rollers, thus interfering with the operation of the conveyor 10. Any lost time in moving goods because of drive pad malfunction is costly and defeats the purpose of installing high speed, high tech conveyor systems. To avoid this problem, pads have to be manually inspected using calipers or gauges, which is costly of manpower and difficult to achieve over the length of the pad.

Figure 4:
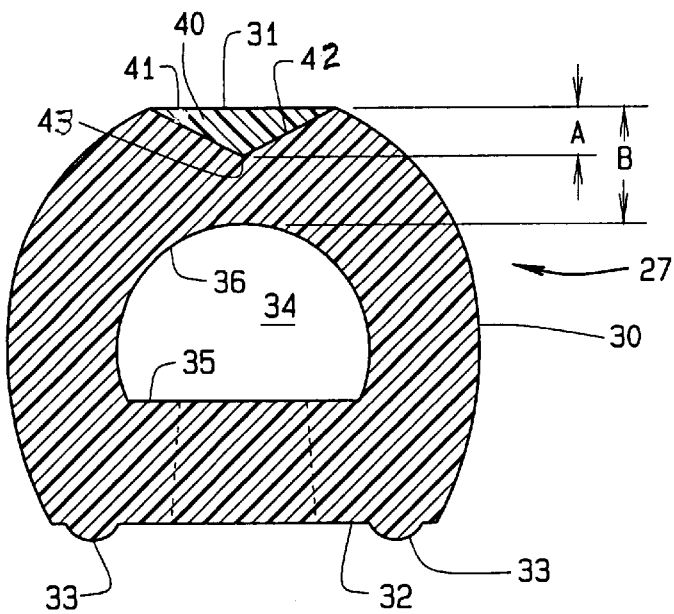
FIG. 4 is an enlarged vertical sectional view of the pad of this invention in an unworn state.

FIG. 4 shows an enlarged view of the improved driver pad 27 of this invention which obviates the problem of normally checking the pad 27 for wear. The pad 27 is made of polyurethane, preferably of Shore A hardness of about 85 to about 90. The pad 27 has curved outer side walls 30, a flat top drive surface 31 which engages the rollers 15, a recessed flat bottom surface 32 and two ribs 33 between the side walls 30 and the recessed bottom surface 32. The center 34 of the pad 27 is hollow and defined by a flat bottom 35 and an arcuate inner surface 36. The portion of the pad 27 between the top drive surface 31 and the inner surface 36 is formed by a co-extrusion process wherein a wear indicator insert 40 is extruded with the remainder of the pad 27, but is of a different contrasting color than the remainder of the pad 27.

The composition of the wear indicating element insert 40 is the same as the remainder of the pad 27 and it is integral with the remainder of the pad 27 due to the co-extrusion process.

The element 40 preferably is triangular in shape so that it indicates the degree of wear on the pad 27. The base 41 of the triangular element 40 defines all or a substantial part of the top surface 31 of the virgin pad 27 and the converging sides 42 taper to an apex 43 inside the pad 27. The apex 43 is sufficiently deep in the pad 27 to provide good wear, but is spaced from the center opening inner surface 36 a sufficient distance to provide sufficient drive to the rollers for the pad 27 to function for a time sufficient for inspectors to determine the wear on the pad 27 and replace it. Preferably, the depth of the apex 43 (denoted by the distance "A" in FIG. 4) is from about to about $$\frac{0.063}{0.178} \text{ to about } \frac{0.063}{0.118}$$

of the top wall thickness between the top surface 41 and the arcuate inner surface 36 (denoted by the distance "B" in FIG. 4).

Figure 4A:
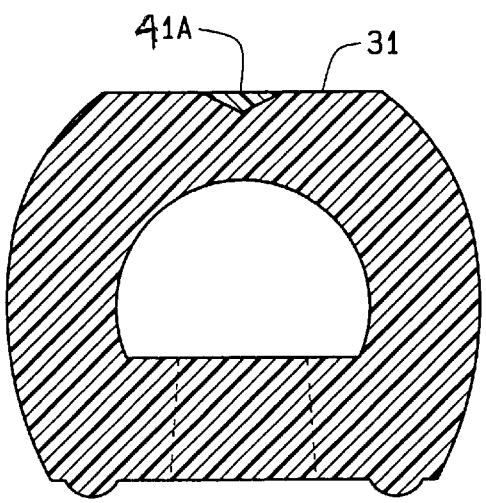
FIG. 4A is an enlarged vertical sectional view of the pad of FIG. 4 in a partially worn state.

FIG. 4A shows the pad 27 in a condition of partial wear with a smaller colored base 41A visible compared to the remainder of the top drive surface 31.

Figure 4B:
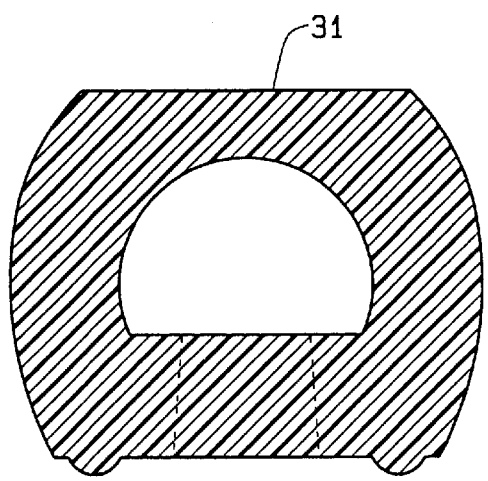
FIG. 4B is an enlarged vertical sectional view of the pad of FIG. 4 in a worn state ready for replacement.

When there is no wear color present (FIG. 4B), the driver pad 27 is fully worn and needs replacement. These observations can be made along the entire length of the driver pad 27, even by an observer at one location, and can be made while the conveyor is running. The ease of making these wear observations, as compared to a manual measuring operation, encourage replacing the drive pad 27 as part of a preventable maintenance program, rather than checking and replacing when a problem occurs.

While a preferred embodiment of the invention has been disclosed, it is understood that modifications are encompassed in this disclosure which are substantial equivalents and are to be included within the scope of this invention. For example, the driver pad 27 may be a series of short sections rather than one continuous length as disclosed in U S. Pat. No. 4,588,073. The wear indicating element 40 can be trapezoidal in shape.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

Having thus described the invention, what is claimed and desired to be secured by Letters Patent is:

1. In an article conveyor having live rollers supporting the articles, a driven roller chain juxtaposed to said live rollers and a high polymeric driver friction pad having a friction surface for presentation to the live rollers, the pad being removably mounted on the roller chain, the improvement comprising a wear indicating structure for the driver pad comprising a visually distinct element in the driver pad, the base of said element initially forming a substantial part of the friction surface presented to the rollers, the element having converging sides tapering from the base toward each other in the driver pad, the wear indicating element being visually distinguishable from the remainder of the pad whereby an observer can visually determine the wear on the pad as the pad is circulated on the chain.

2. The improvement of claim 1 wherein the wear indicating element is a different color than the remainder of the pad.

3. The improvement of claim 1 wherein the wear indicating element is substantially triangular in cross-section and wherein the tapered sides of the wear indicating element converge to an apex whereby when the apex disappears, an observer can tell the pad needs replacement.

4. The improvement of claim 1 wherein the pad and the insert are co-extruded.

5. The improvement of claim 1 wherein the pad and the insert are of the same composition.

6. The improvement of claim 1 wherein the pad and the element are of polyurethane.

7. The improvement of claim 3 wherein the pad has a hollow center.

8. The improvement of claim 7 wherein the depth of the apex is from about $$\frac{0.063}{0.178} \text{ to about } \frac{0.063}{0.118}$$

of the top wall thickness of the pad.

9. The improvement of claim 2 wherein the driven pad and the element have a durometer of Shore hardness about 85 to about 90.

* * * * *